Sept. 25, 1934.  W. C. JACKSON  1,974,461
CLAMP FOR FENDER FLAPS
Filed June 19, 1934   2 Sheets-Sheet 1
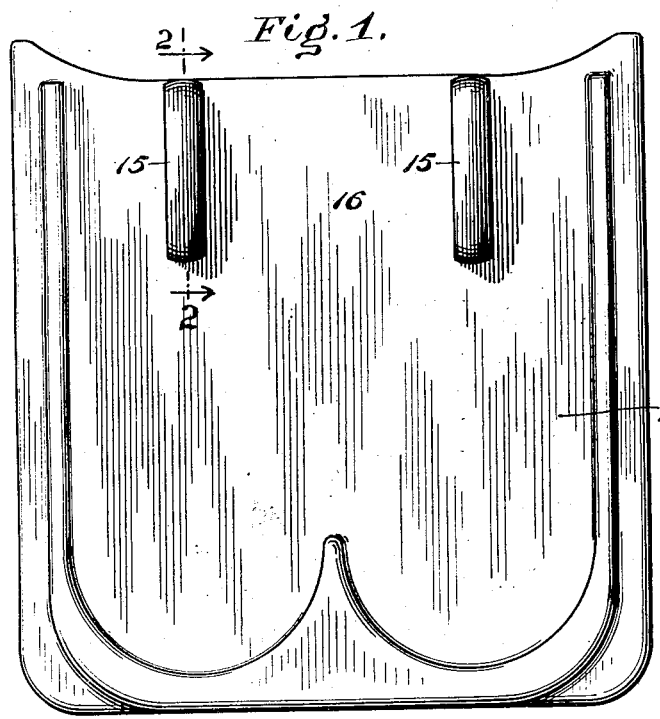
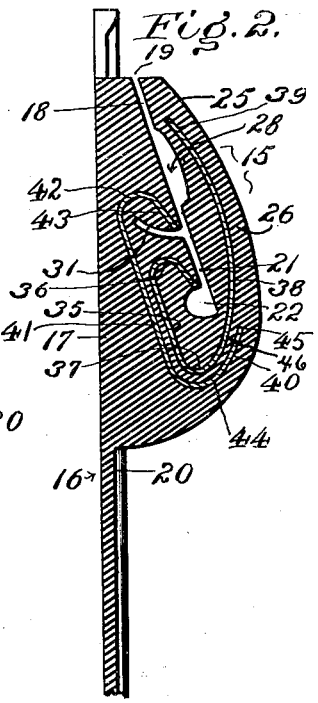
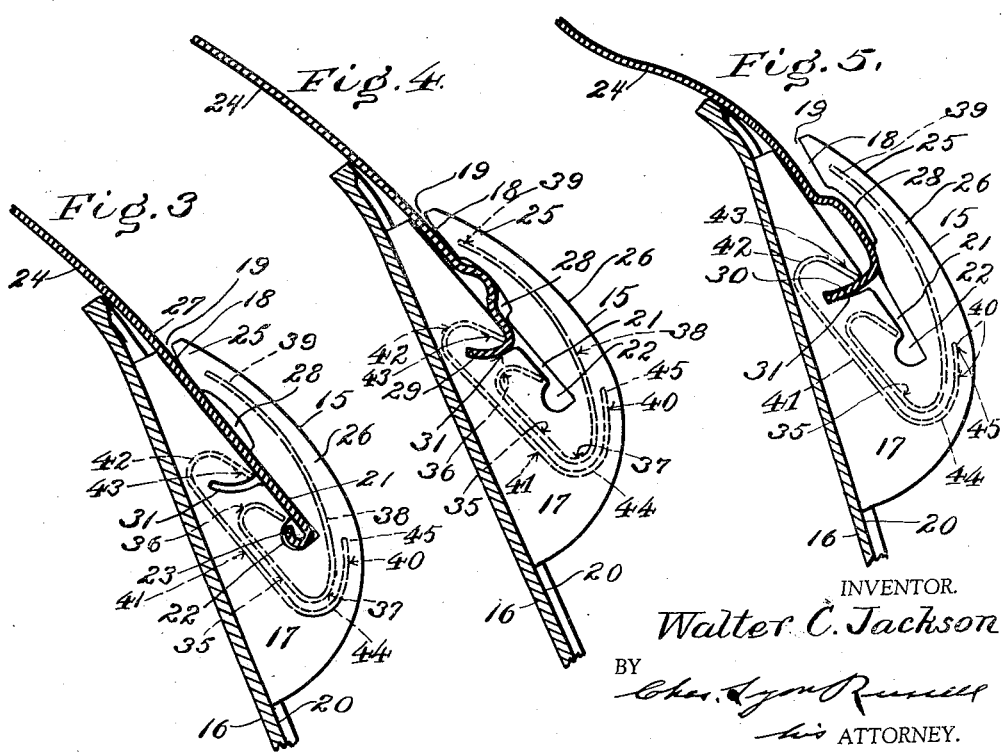
INVENTOR.
Walter C. Jackson
BY
his ATTORNEY.

Sept. 25, 1934.  W. C. JACKSON  1,974,461
CLAMP FOR FENDER FLAPS
Filed June 19, 1934   2 Sheets-Sheet 2
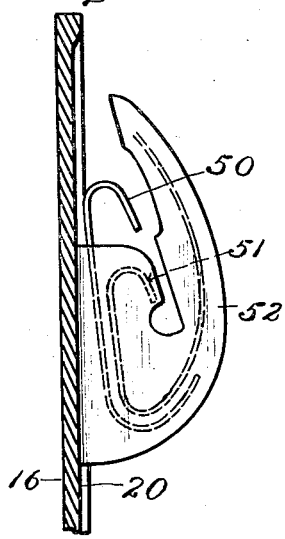
Fig. 6.
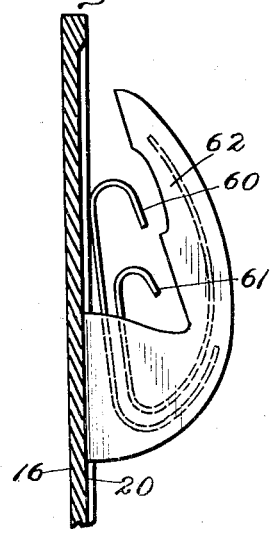
Fig. 7.
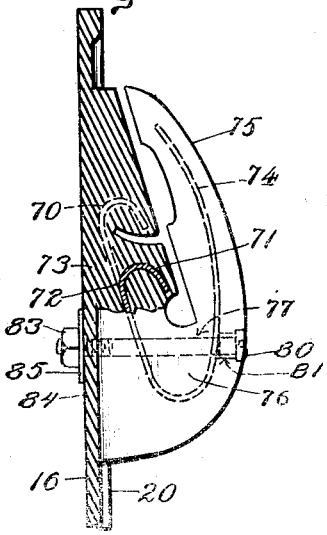
Fig. 8.
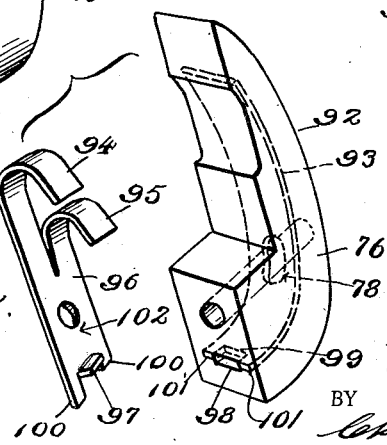
Fig. 9.
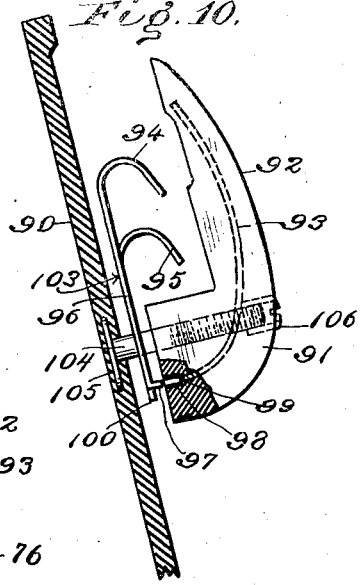
Fig. 10.
Fig. 11.
INVENTOR.
Walter C. Jackson
BY
ATTORNEY.

Patented Sept. 25, 1934

1,974,461

UNITED STATES PATENT OFFICE 1,974,461

CLAMP FOR FENDER FLAPS

Walter C. Jackson, Rahway, N. J., assignor to Tingley-Reliance Rubber Corporation, Rahway, N. J., a corporation of New Jersey Application June 19, 1934, Serial No. 731,277

20 Claims. (Cl. 280—152)

This invention relates to a universal or double purpose clamp for use on splash guards or flaps which are designed to be attached to the lower edges of automobile fenders or mud guards. An object of the invention is to provide a clip or clamping device which is capable of receiving and holding automobile fender edges of various formation.

Up to within quite recently most of the fenders had their edges finished by a bent over bead which was located on the inside face of the fender. A newer form of construction of fender is a curled edge—that is an edge curled or bent inwardly. This latter type of the edge extends inwardly from the outer surface of the fender further than does the bead, a result of which is that a clamp formed for receiving one of these will generally not work satisfactorily upon the other.

Splash guards or fender flaps are generally distributed to the public through mail order houses and through small dealers and gasoline filling stations. Like most supplies which are to be bought quickly and applied at the time of purchase, the distributor, both for economy of time and capital invested, desires to use a device of universal application. I therefore have provided my fender flap with a simple form of clamp which will accommodate itself to the prevailing styles of automobile fender finish.

In the drawings accompanying this specification one practicable embodiment of my invention is illustrated in which drawings Figure 1 is a face view of a fender flap or splash guard upon which are illustrated two of my improved clamps.

Fig. 2 is a sectional view of the clamp taken at about the place of the line 2—2 of Fig. 1.

Fig. 3 is a side view of one of the clamps showing this attached to a fender formed at the edge with a bead, the fender being shown in longitudinal section as is also a portion of the apron portion of the flap.

Fig. 4 shows a similar view in which the clamp is attached to a fender having a curled over end. This is the prevailing Buick type.

Fig. 5 is a similar view showing the clamp attached to an in-turned end on the edge of a fender. This is the prevailing Chevrolet type.

Fig. 6 shows a modified form of construction in which the upper end of the spring member for reinforcing the curled end receiving slot is exposed or naked.

Fig. 7 is a somewhat similar view, the ends for the reinforcing of both of the holding portions being shown naked.

Fig. 8 shows a form of construction quite similar to that represented in Fig. 2, but with a bolt or stay member passing through the clamp and located in position for stiffening the finger portion of the clamp and its reinforcing member.

Fig. 9 is a perspective view of the form of spring reinforcing member illustrated in Fig. 8, and the stay bolt disassembled.

Fig. 10 is a view partly disassembled showing the form of clamp in which the hooked members are formed on a piece separate from the member which reinforces the finger and adapted to be interlocked with it, the whole held in position by means of a stay bolt, and Fig. 11 is a detailed perspective showing the hooked end and finger member disassembled.

My improved clamp adapts itself admirably for use in the various types and constructions of fender flaps and lends itself also admirably to use in an all rubber fender flap; that is one in which the apron portion of the flap is formed of vulcanized rubber and the clamp or grip device, aside from the spring structures, is formed of plastic material and also in those in which the plastic material which forms a part of the clamp is moulded on to the spring and vulcanized with it. It is also adapted to a clamp which is preferred in certain trade in which the clamp is held in place on the apron or is reinforced in its attachment by some securing means.

In Figure 1 there are shown two of these gripping or clamping devices 15 at the top of the flap or apron 16. The body portion 17 of the clamp which is preferably formed or moulded of vulcanized rubber merges into the body of the apron. These are shown located at the respective sides of the center of the flap.

A slot 18 is shown entering into the body of the clamp. The slot is preferably slanting so that its upper end 19 is a less distance from the face 20 of the apron than is its lower end 21.

The lower end of the slot is formed with a rounding pocket 22 adapted to receive a bead at the lower end of an automobile fender, for instance, the bead 23 of the fender 24 shown in Fig. 3. The upper or free end 25 of the finger portion 26 of the clamp is located in a position to engage the outer face 27 of the automobile fender 24 to which the device is applied. Shortly below the upper end of the finger, the slot 18 has an enlargement 28 for permitting the more ready passage of the edge of a fender which is finished with an inward bend curl. For instance the bends 29 and 30 of Figures 4 and 5. Shortly below the enlargement 28 and upon the opposite side of the body there is formed a curved slot 31, which in the illustration is given a shape which at the present time is prevalent in some of the newer style automobile fenders.

It is desirable to reinforce the natural elasticity of the finger 26 and also to provide locks for engaging in the trough formed by the incurling of the fender and by the bead respectively. In the present illustration there is shown a reinforcement in the form of a spring member. In Figs. 1 to 7 this comprises a main spring having a body part 35 lying within the body part of the clamp and to the rearward of the lower end 21 of the slot. The spring is curled over at 36 and provides an end for engaging into the corner formed between the bead and the inside of the fender for hooking on and holding the clamp in position. At the lower end 37 of its body portion 38 this spring rounds outwardly and upwardly, passing through the finger 26 and has an inward curve 39 at the upper free end 25 of the finger. This is to reinforce the finger and to sustain the hook in position back of the bead.

A secondary spring is also provided which is of somewhat the same shape as the main spring only it has a shorter outer end 40, its body portion 41 is longer and it is located backwardly of the main spring. It curves over at its upper end 42 and has a free end 43 located in position to occupy the point formed by the main slot and the curved slot 31 for receiving the curl. At its lower end 44 this spring curves around below the lower curve of the main spring and its end 45 extends in front of the portion 46 of the main spring which is located in the beginning of the finger portion 26 of the clamp.

In the preferred form of my clamp the springs are held in place by being either partly or entirely enveloped in the rubber or other plastic material of which the body of the clamp is formed.

In the form of my invention illustrated in Figure 6 the upper portion, but particularly the hooked over end 50 of one of the springs is entirely naked and exposed, the hooked over end 51 active in connection with the bead receiving enlargement as illustrated encased within the body portion 52 of the clamp.

In Fig. 7 both hooked over ends 60 and 61 are shown entirely naked and exposed. In this illustration the slot or passage way through which the end of the fender passes in applying the device is formed by these bent over hooked ends and the finger 62.

In Figures 8 and 9 I have shown two hooked over ends 70 and 71 which are integrally connected, they being formed by splitting or slitting the end of a single spring member 72. By this means one part only need be provided which makes a simpler form of construction than where two springs are employed especially in the operation of moulding the body of rubber or other plastic material 73 about this reinforcing member. It also gives the advantage that the portion 74 which extends up into the finger 75 is a wide single piece.

Sometimes, especially in the construction where a single spring is employed, it may be found desirable to employ means for staying the reinforcing finger, particularly where it merges into the base or body portion 76 of the clamp and also for the purpose of tightening the clamp against accidental disengagement from the fender. A simple form of device for accomplishing this is a stay bolt 77 which is to pass through the openings 78 and 79 formed in the spring member 73. It is preferable that one of these, as for instance the opening 78, be elongated to accommodate relative movements of the parts in clamping and unclamping it. The stay bolt is shown provided with a head preferably formed rigid with it, the head having an enlarged screw threaded engaging portion 80 and a shoulder portion 81 which is adapted to engage the outer face of the spring member 73 at the sides of the opening 78, especially when the head member is completely seated in an opening in the finger or body portion. The screw threaded end 82 on the stay member 77 is adapted to be engaged by a nut 83 conveniently located on the rear face 84 of the flap. A suitable other plain or lock washer 85 may be interposed between the nut 83 and the material of which the flap is composed.

In some cases it is found desirable to have the clamp removable from the apron. Such a construction is illustrated in Figures 10 and 11 in which a plain apron 90 is illustrated, the clamp illustrated comprising a body portion 91 formed with an upstanding finger 92 preferably having moulded within it a spring reinforcing plate 93. The hooked ends or turned over ends 94 and 95 are shown formed upon a short plate 96. This plate is physically separated from the reinforcing member 93 of the finger and body, but is adapted for intimate engagement therewith, it being formed with a bent up lug 97 adapted to enter a cavity 98 formed in the body portion 91 and in the lower end 99 of the spring member 93.

The portions 100 which remain at the sides of the place from which the lug 97 was struck up, are located in position to engage the sides 101 of the rear of the body portion and to be clamped between these and the front face 102 of the apron 90. In practice the rear face 103 of the hook carrying member 96 is pressed against this front face.

This form of the device is shown partly assembled in Figure 10 in which the stay member 104 is intended to be permanently associated with the apron member 90, the stay member having a large flat head 105 made integrally with the apron. The apron is formed of vulcanized rubber—its staple and head will be inserted into the rubber when moulded and will be vulcanized in position. The head 106 which has a screw threaded connection with the upper end of the staple is adapted to be seated in a cavity in the body portion 91 and to engage the outer face of the reinforcing plate 93. When the screw head is thoroughly screwed down, of course, the spaces between the parts represented in Figure 10 will be completely closed up and the device fully clamped in position. In many instances the passage way between the inner or rear face of the finger 92 and the hooked ends 94 and 95 will be so narrowed or closed that the device may be thus clamped in position upon the fender.

Having thus described my invention I claim and desire to secure by Letters Patent:

1. A clamp for a fender flap having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender.

2. A clamp for a fender flap having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger.

3. A clamp for a fender flap having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp embodying a spring member having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends.

4. A clamp for a fender flap comprising a body portion formed of plastic material and having a passageway formed in it for receiving the end of an automobile fender, the inner end of the slot having an enlargement for receiving the bead at the edge of the automobile fender, there being a slot extending rearwardly from the main slot for receiving an inwardly bent edge of the automobile fender, and a reinforcing member having at least a portion embedded within the body portion of the clamp, the said reinforcing spring having a hooked end disposed above and rearwardly of the bead receiving enlargement, and also having a hooked end disposed above and rearwardly of the entrance of the rearwardly extending slot, and an outwardly and upwardly curving portion.

5. A clamp for a fender flap having a body portion formed of plastic material, having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp also embodying a spring member embodied in part, at least, on the said plastic material, having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends.

6. A clamp for a fender flap having a body portion formed of plastic material, having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp also embodying a spring member embodied in part, at least, in the said plastic material, having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends, at least one of the hooked ends being naked and exposed.

7. A clamp for a fender flap having a body portion formed of plastic material, having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp also embodying a spring member embodied in part, at least, in the said plastic material, having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends, one of the said hooked ends being naked and exposed.

8. A clamp for a fender flap having a body portion formed of plastic material, having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp also embodying a spring member embodied in part, at least, in the said plastic material, having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends, both of the said hooked ends being naked and exposed.

9. A clamp for a fender flap comprising a body portion formed of plastic material and having a slot formed in it for receiving the end of an automobile fender, the inner end of the slot having an enlargement for receiving the bead at the edge of the automobile fender, there being a main reinforcing spring having a hooked end disposed above and rearwardly of the bead receiving enlargement, a body portion and an outwardly and upwardly curving end, there being a curved slot extending upwardly and rearwardly from the main slot for receiving the inwardly bent edge of an automobile fender, and a secondary spring having a hooked end disposed above and rearwardly of the entrance of the rearwardly extending slot, a body portion and an outwardly and upwardly curving end lying outside of the main spring and ending below the bead receiving portion of the clamp.

10. A clamp for a fender flap comprising a body portion formed of plastic material and having a downwardly directed slot formed in it for receiving the end of an automobile fender, the lower end of the slot having an enlargement for receiving the bead at the edge of the automobile fender to which the device is applied, there being a main reinforcing spring having a hooked end disposed above and rearwardly of the bead receiving enlargement, a body portion and an outwardly and upwardly curving end, there being a slot extending rearwardly from the main slot for receiving an inwardly bent edge of the automobile fender, and a secondary spring having a hooked end disposed above and rearwardly of the entrance of the rearwardly extending slot, a body portion and an outwardly and upwardly curving end lying outside of the main spring and ending below the bead receiving portion of the clamp.

11. A clamp for a fender flap comprising a body portion formed of plastic material and having a slot formed in it for receiving the end of an automobile fender, the inner end of the slot having an enlargement for receiving the bead at the edge of the automobile fender, and two spring members having at least a portion of each embedded within the body portion of the clamp, there being a main reinforcing spring having a hooked end disposed above and rearwardly of the bead receiving enlargement, a body portion and an outwardly and upwardly curving end, there being a slot extending rearwardly from the main slot for receiving an inwardly bent edge of the automobile fender, and a secondary spring having a hooked end disposed above and rearwardly of the entrance of the rearwardly extending slot, a body portion and an outwardly and upwardly curving end lying outside of the main spring and ending below the bead receiving portion of the clamp.

12. A clamp for a fender flap comprising a body portion formed of plastic material and having a downwardly directed slot formed in it for receiving the end of an automobile fender, the lower end of the slot having an enlargement for receiving the bead at the edge of the automobile fender to which the device is applied, there being a main reinforcing spring having a hooked end disposed above and rearwardly of the bead receiving enlargement, a body portion and an outwardly and upwardly curving end, there being a slot extending rearwardly from the main slot for receiving an inwardly bent edge of the automobile fender, the main slot being widened above the entrance to the said rearwardly extending slot, and a secondary spring having a hooked end disposed above and rearwardly of the entrance of the rearwardly extending slot, a body portion and an outwardly and upwardly curving end lying outside of the main spring and ending below the bead receiving portion of the clamp.

13. A clamp for a fender flap having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp embodying a spring member having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends and means for staying the finger.

14. A clamp for a fender flap having a main passageway formed in it for receiving the end of an automobile fender, the inner portion of the passageway being enlarged for receiving a bead at the edge of the automobile fender, there being a passageway extending rearwardly from the main passageway for receiving the inwardly bent edge of an automobile fender, the clamp outwardly of the main passageway being formed as a finger, the clamp embodying a spring member having a hooked end disposed above and rearwardly of the bead receiving enlargement, a hooked end disposed above and rearwardly of the entrance to the rearwardly extending slot, and a portion forming part of the finger, the extreme end of the finger being located beyond both of the said hooked ends and in position to engage a fender to which the clamp has been applied at a point above the uppermost of the said hooked ends, and means for staying the finger and the spring member associated with it.

15. A clamp for a fender flap comprising an associated body portion and finger located in such relative positions, as to form a downwardly directed slot for receiving the end of an automobile fender, the lower end of the slot having an enlargement for receiving the bead at the edge of the automobile fender to which the device is applied, the body portion embodying a main reinforcing spring having a hooked end disposed above and rearwardly of the bead receiving enlargement, a body portion and an outwardly and upwardly curving end, there being a slot extending rearwardly from the main slot for receiving an inwardly bent edge of the automobile fender, the body portion also embodying a hooked end disposed above and rearwardly of the entrance of the said rearwardly extending slot.

16. A clamp for a fender flap comprising an associated body portion and finger located in such relative positions as to form a downwardly directed slot for receiving the end of an automobile fender, the lower end of the slot having an enlargement for receiving the bead at the edge of the automobile fender to which the device is applied, there being a slot extending rearwardly from the main slot for receiving the inwardly bent edge of an automobile fender, a reinforcing device located within the body portion, it having a hooked end disposed above and rearwardly of the bead receiving enlargement, a hooked end disposed above and rearwardly of the entrance of the said rearwardly extending slot and an outwardly and upwardly curving end located in the finger.

17. A clamp for a fender flap comprising an associated body portion and finger located in such relative positions as to form a downwardly directed slot for receiving the end of an automobile fender, the lower end of the slot having an enlargement for receiving the bead at the edge of the automobile fender to which the device is applied, there being a slot extending rearwardly from the main slot for receiving the inwardly bent edge of an automobile fender, a one piece reinforcing device located within the body portion, it having a hooked end disposed above and rearwardly of the bead receiving enlargement, a hooked end disposed above and rearwardly of the entrance of the said rearwardly extending slot and an outwardly and upwardly curving end located in the finger.

18. A clamp for a fender flap comprising an associated body portion and finger located in such relative positions as to form a downwardly directed slot for receiving the end of an automobile fender, the lower end of the slot having an enlargement for receiving the bead at the edge of the automobile fender to which the device is applied, there being a slot extending rearwardly from the main slot for receiving the inwardly bent edge of an automobile fender, a one piece reinforcing device located within the body portion, it having a hooked end disposed above and rearwardly of the bead receiving enlargement, a hooked end disposed above and rearwardly of the entrance of the said rearwardly extending slot and an outwardly and upwardly curving end located in the finger and a stay member passing through the body and the reinforcing device and active on the finger portion thereof.

19. A clamp for a fender flap comprising an associated body portion and finger located in such relative positions as to form a downwardly directed slot for receiving the end of an automobile fender, the lower end of the slot having an enlargement for receiving the bead at the edge of the automobile fender to which the device is applied, there being a slot extending rearwardly from the main slot for receiving the inwardly bent edge of an automobile fender, a reinforcing device located within the body portion, it having a hooked end disposed above and rearwardly of the bead receiving enlargement, a hooked end disposed above and rearwardly of the entrance of the said rearwardly extending slot and an outwardly and upwardly curving end located in the finger, both hooked ends being formed on a single piece of material and the finger reinforcing end being an entirely separate member, and means for attaching the assembled parts of the clamp to the apron of a fender flap.

20. A clamp for a fender flap comprising an associated body portion and finger located in such relative positions as to form a downwardly directed slot for receiving the end of an automobile fender, the lower end of the slot having an enlargement for receiving the bead at the edge of the automobile fender to which the device is applied, there being a slot extending rearwardly from the main slot for receiving the inwardly bent edge of an automobile fender, reinforcing means located within the body portion, it having a hooked end disposed above and rearwardly of the bead receiving enlargement, a hooked end disposed above and rearwardly of the entrance of the said rearwardly extending slot and an outwardly and upwardly curving end located in the finger, the finger reinforcing end being a member entirely separate from the said hooked ends, and means for attaching the assembled parts of the clamp to the apron of the fender flap.

WALTER C. JACKSON.